United States Patent Office 3,711,549
Patented Jan. 16, 1973

3,711,549
PROCESS FOR MANUFACTURING CYCLOPROPYLAMINE
Lee V. Phillips and Roger P. Cahoy, Overland Park, Kans., assignors to Gulf Research & Development Company, Pittsburgh, Pa.
No Drawing. Continuation-in-part of application Ser. No. 756,288, Aug. 29, 1968. This application May 19, 1970, Ser. No. 38,878
Int. Cl. C07c 85/02
U.S. Cl. 260—563 R
1 Claim

ABSTRACT OF THE DISCLOSURE

In a procedure for manufacturing cyclopropylamine beginning with ring closure of a lower alkyl 4-chlorobutyrate followed by amidation of the corresponding cyclopropanecarboxylate so produced and conversion of the amide to the amine by means of the Hofmann reaction, maximum yields of useful product are obtained by conducting the amidation by ammoniation in non-reactive organic liquid medium in the presence of an alkali metal alkoxide and after adding water to the amidation product, separating and recycling the organic liquid phase to the ring closure step; by acidification and use of the unpurified aqueous amidation product solution in the Hofmann reaction, in which the acidified aqueous solution of the amide is first added to a solution of alkali metal hypochlorite, then alkali metal hydroxide is added and the temperature is raised to convert the intermediate product to the amine, and finally recovering cyclopropylamine in the form of an aqueous solution by steam distillation.

DESCRIPTION OF INVENTION

This is a continuation-in-part of U.S. patent application Ser. No. 756,288, filed Aug. 29, 1968, now abandoned.

Cyclopropylamine belongs to the class of products usually called "fine chemicals" and is useful as an intermediate in manufacture of certain biologically active chemicals. In particular, this amine may be reacted with cyanuric chloride in the customary manner to form 4- and 6-cyclopropylamino-substituted 2-chloro-s-triazines which are new and useful members of the class of amino-substituted s-triazine herbicides.

Cyclopropylamine is miscible with water in all proportions. Physical properties reported for this compound include the following: $d_4^{20}$ 0.8240; $n_D^{20}$ 1,4210; boiling point 50° C.

The use of cyclopropylamine has so far been limited by the cost of manufacture, the conventional synthesis route requiring several steps, involving substantial losses in each step. Laboratory preparation of cyclopropylamine is described in J. Am. Chem. Soc., vol. 63, p. 1733 (1941).

A commercial chemical which may be used as the ultimate starting material for manufacture of cyclopropylamine is gamma-butyrolactone, manufacture of which is based on acetylene and formaldehyde as ultimate raw materials. Gamma-butyrolactone is readily converted to 4-chlorobutyric acid by hydrochlorination. This acid may be esterified and the ester converted to the corresponding cyclopropanecarboxylate by ring closure.

The cyclopropanecarboxylate may be converted to the corresponding amide by means of a reversible reaction with ammonia, which is usually less efficient than other routes to the amide based on the free acid and the amide product may then be converted by the conventional Hofmann reaction with strongly alkaline hypochlorite to the amine. Various synthesis routes are known and can be readily planned and carried out by a worker of ordinary skill, for laboratory purposes. (See J. Am. Chem. Soc., vol. 63, 1734.) However, the overall yields are disappointingly low and entirely unsuitable for commercial manufacture.

It has now been discovered that certain intermediate purifications between steps can be dispensed with advantageously, the amidation can be driven more nearly to completion by use of a non-reactive organic liquid reaction medium and that recovery of the non-reactive liquid reaction medium after amidation and recycling to the ring closure step substantially improves overall yields. Another feature of the process which contributes significantly to the overall results is the specific manner in which the Hofmann reaction is performed, as explained in the illustrative example and detailed discussion which follows:

Briefly, the invention is a procedure for manufacturing an aqueous solution of cyclopropylamine comprising performing the following steps in the sequence and manner set forth below:

(a) Reacting methyl 4-chlorobutyrate with sodium methoxide under an inert gas atmosphere in a non-reactive organic liquid reaction medium under substantially moisture-free conditions and in the presence of an organic liquid phase recycled from step (e) to yield a product mixture containing methyl cyclopropanecarboxylate, (b) Reacting gaseous ammonia with the product mixture from step (a) at a temperature between 80° and 115° C. in the absence of water and in the presence of 0.1 to 0.3 mole of sodium methoxide and 40 to 80 ml. of methanol per mole of methyl cyclopropanecarboxylate, said ammonia being present in a ratio of about 1.5 to 3 moles per mole of methyl cyclopropanecarboxylate, thereby obtaining a reaction product mixture containing cyclopropanecarboxamide, (c) Removing methanol and unreacted ammonia from the reaction product mixture of step (b), thereby obtaining a distillation residue consisting essentially of non-reactive organic liquid reaction medium, cyclopropanecarboxamide and unchanged cyclopropanecarboxylate, (d) Adding the distillation residue obtained in step (c) to sufficient water and mineral acid to obtain an aqueous solution phase having a pH below 6.5 containing the cyclopropanecarboxamide dissolved therein and an organic liquid phase, (e) Separating and drying the organic liquid phase obtained in step (d) and recycling the dried liquid phase to step (a), (f) Reacting sodium hypochlorite and sodium hydroxide with the aqueous solution phase obtained in step (d) by first adding the aqueous solution phase at a controlled rate to an aqueous solution of sodium hypochlorite at a temperature near 0° C. to yield a homogeneous solution reaction mixture containing an intermediate product, then adding sodium hydroxide to the homogeneous solution reaction mixture at a temperature near 0° C., then raising the temperature of the resulting reaction mixture to between 40° C. and 50° C. and controlling the temperature between 40° C. and 50° C. while reacting sufficient sodium hydroxide with the reaction mixture containing the intermediate product to yield a product mixture containing cyclopropylamine and (g) Subsequently distilling the product mixture of step (f) to yield an aqueous solution of cyclopropylamine as a distillate product.

ILLUSTRATIVE PROCEDURES

The lower alkyl 4-chlorobutyrate may be prepared conveniently according to the following procedure, or a modification thereof.

Preparation of gamma-chlorobutyric acid

A dry 2-liter capacity, glass-lined stirred autoclave equipped with a dip tube is charged with 1 kg. (11.6 moles) of gamma-butyrolactone and 4 g. (0.029 mole) of freshly fused zinc chloride. The stirrer is started and addition of anhydrous hydrogen chloride is begun. The initial reaction is strongly exothermic and the rate of addition of hydrogen chloride is adjusted to keep the temperature below about 120° C. so that water may be used conveniently as a heat exchange medium for cooling, if that should become necessary. Hydrogen chloride addition is continued until a pressure of 300 p.s.i.g. is easily maintained at 120° C. The reactor is then held at 300 p.s.i.g. and 120° C. with stirring for another two hours. The reactor is cooled and vented, yielding approximately 1455 g. of product which is found by analysis to consist of 70 to 90 percent gamma-chlorobutyric acid, the remainder consisting principally of the ester represented by the structural formula:

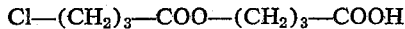

This by-product is partially utilized in the succeeding step, so that purification at this stage is unnecessary.

Preparation of methyl gamma-chlorobutyrate

In a dry 5-liter three-necked flask, equipped with a magnetic stirrer and a reflux condenser are placed 1810 g. (2280 ml., 56.5 moles) of methanol and 1415 g. (11.3 moles) of crude gamma-chlorobutyric acid obtained by the above procedure. The reaction mixture is stirred and heated at reflux temperature for 2 hours. The solution is cooled to room temperature and worked up by the procedure described below.

The reaction product is distilled until distillation pot temperature reaches 90° C. under one atmosphere and 85 to 90 percent of the unreacted methanol is recovered ad distillate. The distillation residue is then cooled to room temperature and poured into an equal volume of water. The mixture separates into an upper aqueous layer and a lower organic layer, consisting principally of methyl gamma-chlorobutyrate. Additional product may be recovered from the aqueous layer by extraction with toluene. The toluene extract may then be added to the separated ester for use in the present process. The yield of ester is about 90 to 95 percent based on gamma-butyrolactone.

Step (a) preparation of methyl cyclopropanecarboxylate

This step may be conveniently carried out in the laboratory as exemplified by the following procedure:

A 5-liter three-necked flask equipped with an addition funnel, mechanical stirrer, reflux condenser and a thermometer is flushed with an inert gas (nitrogen or argon) then charged with 119 g. (2.2 moles) of dry, powdered sodium methoxide and 340 ml. of dry toluene. The slurry is heated to 100° C. and the 560 g. of 48.9% methyl γ-chlorobutyrate in toluene added slowly during the course of 2 hrs. About 30 min. after addition is begun, moderate reflux begins and the temperature begins to fall. Any increase in rate of addition causes more vigorous refluxing. The slurry is refluxed for about 6 hrs. after addition is completed. During the first 2½hrs. after addition has been completed, the pot temperature falls slowly to about 76° C. where it remains for the duration of the reaction. The very viscous slurry is preferably cooled and employed in step (b). However for purposes of illustration and to determine reaction efficiency, the product may be isolated.

Neutralization with acid and isolation of the product at this stage give results which indicate that the yield of this step is about 92 percent. In continuous operation of the process a substantial portion of the toluene or other non-reactive organic liquid employed in this step will actually be recycled organic liquid phase from step (e) containing some unreacted ester carried through from step (c). Preferably the recycled material will be dried before use in step (a).

Step (b) amidation of lower alkyl cyclopropanecarboxylate

Below is presented an illustrative laboratory procedure for the amidation step:

A two-liter autoclave equipped with a rotary stirrer is flushed with nitrogen. A solution of 8.0 g. (0.15 mole) of sodium methoxide in 40 ml. of methanol is added to the vessel. Toluene (390 ml.) and 95.2 g. (0.95 mole) of methyl cyclopropanecarboxylate are added. The autoclave is sealed and placed in a jacketed heater. A motor is connected to the stirrer. The pressure tubing from an ammonia cylinder with appropriate fittings and valves is connected to the vessel. The system is filled three times with ammonia to a gauge pressure of 25 pounds followed by venting, then is sealed and stirred with heating for about five hours. The following is a typical record of time, temperature and pressure during the reaction.

| Time | Temp., °C. | Pressure, p.s.i.g. |
|---|---|---|
| 11:10 | 28 | |
| 11:11 | 28–33 | 50-0-50 |
| 11:14 | 36 | 21 |
| 11:30 | 45 | 28 |
| 11:37 | 60 | 35 |
| 11:48 | 73–77 | 48-100 |
| 11:50 | 88 | 85-102 |
| 12:15 | 78 | 75-102 |
| 12:35 | 80 | 93-105 |
| 13:40 | 80 | 78-107 |
| 15:07 | 78 | 78-107 |
| 16:07 | ¹ 78 | 78-107 |
| 16:30 | ² 58 | 107 |

¹ Heater off.
² Stirrer off.

After standing until the following day, the vessel indicates about 20 p.s.i.g. at 22°.

Conversion of starting material to cyclopropanecarboxamide by the above procedure is about 85 to 90 percent. A recovery of product indicating about 88 percent conversion is feasible at this stage of the process, if desired. This step is the most critical stage of the process, not only because the conversion to product is lower, but because the amide product is sensitive to alkaline hydrolysis.

Several features of the above procedure are critical to successful operation. The preferred concentration of methanol has been determined to be 40 to 80 ml. per mole of methyl cyclopropanecarboxylate (20–25° solution in toluene.) When toluene is excluded, low yields of amide are obtained. This demonstrates that reaction equilibrium is operating. No product is formed when sodium methoxide is excluded and inferior yields are obtained, for example, when only 0.05 mole of sodium methoxide is used in the above procedure. Ammonium chloride does not function as a catalyst. The conversion to product drops to about 59% when methanol is excluded, indicating that catalyst solubility is a necessary requirement. The catalyst system as well as the reagents should be as dry as possible. In the presence of both sodium methoxide and water, the amide is easily hydrolyzed to sodium cyclopropanecarboxylate, with resulting loss of yield of final product.

Reaction times may vary from two to five hours. Under optimum conditions, the reaction rate is quite rapid. This is facilitated by use of an excess of ammonia beyond the one mole required, preferably about 1.5 to 3 moles. Some heat is evolved when solution of ammonia into the liquid system is indicated (i.e., when the agitator is started). An exothermic response of several degrees is likely to occur as the vessel reaches 70° C. Within the preferred range of reaction temperature of 80° to 115° C. the best conversions are obtained.

Step (c) stripping ammonia and methanol from amidation product

This step employs the reaction mixture obtained in step (b). After venting the vessel, the entire reaction mixture is charged to a distillation flask along with an additional 200 ml. of toluene. Under reduced pressure, 521 ml. of overhead condensate is collected. This overhead condensate is preferably distilled to recover methanol. In commercial practice, the remainder of the overhead, consisting mainly of toluene, is conveniently returned to the distillation residue, but may also be combined with the organic phase which is separated in step (e) and recycled to step (a), so as to supply the requirements for unreactive solvent in the first step.

Step (d) addition of stripped amidation product to water and phase separation The distillation residue from step (d) is treated with 450 ml. of water. With cooling and stirring, about 20 ml. of concentrated hydrochloric acid is added to the water prior to addition of the distillation residue so as to attain about pH 4. Acidification with a mineral acid to a pH below 6.5 is preferred, so as to prevent a loss of yield which occurs with time. However, if step (f) is performed without delay, product losses are very small. The water layer is withdrawn from a separatory funnel and the organic phase is extracted twice more with water. The aqueous extracts are combined (840 ml.). The extraction step is optional, but is advantageous because the high degree of solubility of cyclopropanecarboxamide in water results in a favorable distribution ratio. The solubility of cyclopropanecarboxamide in water at room temperature and below is as follows:

| Temp. °C.: | Solubility, g. cyclopropane-carboxamide/100 g. $H_2O$ |
| --- | --- |
| 25 | 21.4 |
| 15 | 18.5 |
| 2 | 6.9 |

Since the Hofmann degradation to the amine operates in aqueous solution, the combined aqueous phase may be conveniently utilized in step (f) without further treatment.

Step (e) recycling the organic liquid phase from amidation

The organic liquid phase from the amidation step may contain substantial quantities of unreacted methyl cyclopropanecarboxylate. This liquid phase may be employed in step (a) either as solvent for methyl gamma-chlorobutyrate or as a diluent for the sodium methoxide slurry. In this way the solvent requirements of step (a) are met and at the same time it is assured that unreacted ester will again pass through the amidation step, where conversion is only about 90 percent during a reasonable time of reaction.

Step (f) conversion of amide to amine by Hofmann reaction

This step involves reaction of the aqueous solution of cyclopropanecarboxamide with sodium hypochlorite at temperatures near 0° C. This type of reaction is usually conducted by adding an amide to a strongly basic, dilute sodium hypochlorite solution. However, we have found that losses by hydrolysis can be reduced and more concentrated reaction solution can be employed by first adding an acidified solution of the amide at a controlled rate to a concentrated hypochlorite solution so as to avoid hydrolysis by strong base prior to reaction with hypochlorite, then adding the necessary quantity of strong base to complete the conversion to the amine. The method is illustrated by the following laboratory procedure.

A stirred solution containing 50.0 g. (1.25 moles) of sodium hydroxide in 250 ml. of water is cooled at 0 to 5° C. while adding 35.5 g. (0.5 mole) of chlorine. This solution is charged to a two-liter three-necked round bottom flask equipped with a power stirrer, thermometer, cooling bath and water-jacketed addition funnel. The addition funnel is charged with 42.5 g. (0.5 mole) cyclopropanecarboxamide and 150 ml. of water. The cooling bath around the flask is filled with ice and water and ice water is circulated through the jacket of the addition funnel. To the above described solution of cold sodium hypochlorite there is then added dropwise the aqueous solution of cyclopropanecarboxamide, while stirring the resulting mixture in the reaction vessel and maintaining the temperature at 0° C. The addition is completed in about 30 minutes. Homogeneous solution is obtained. The addition funnel is then charged with a solution of 40.0 g. (1.0 mole) of sodium hydroxide in 200 ml. of water. With cooling and stirring, the solution is added during a period of 15 minutes at a temperature near 0° C. After an additional 30 minutes, the reaction solution is warmed to 45–50° and the temperature is controlled within this range for two hours. At this stage, the solution may be allowed to stand overnight at ambient temperature, if desired. Addition of a substantial amount of sodium hydroxide prior to raising the temperature above 40° C. is essential to prevent the formation of dicyclopropylurea instead of the desired product. An exotherm occurs between 40° and 50° C. In commercial practice, adequate heat exchange capacity is necessary so as to maintain control of the temperature until after conversion to cyclopropylamine is complete. Preferably, after mixing with sodium hydroxide, a minor portion of the homogeneous solution reaction mixture is placed in the reactor and is brought up to reaction temperature, after which the remainder of the reaction mixture is added slowly, so as to facilitate the control of reaction temperature.

Conversion of amide to amine in this step is about 95 to 100%. Conversions of better than 95 percent are readily obtained in continuous operation. By use of the improved stepwise reaction procedure in which the amide is kept at a pH below 6.5 until reaction with hypochlorite, substantial hydrolysis and conversion of the amide to alkali metal cyclopropanecarboxylate is eliminated. Furthermore, by making the intermediate product strongly basic prior to initiating the reaction, the undesired production of dicyclopropylurea is avoided.

Step (g) recovery of aqueous cyclopropylamine by steam distillation

The reaction mixture obtained in step (f) is readily distilled by heating, recovering a mixture of cyclopropylamine and water as distillate.

In the illustrative laboratory procedure, the stirrer may be removed from the reaction flask described above and replaced by a suitable Vigreaux column appropriately fitted to condense and collect overhead distillate. Heat is applied to the reaction mixture to effect steam distillation. Most of the cyclopropylamine is recovered in the first 100 ml. of distillate. An illustrative analysis of distillation product collected in four separate portions is given below:

| | Volume, ml. | G. cyclopropylamine determined by gas-liquid chromatography |
| --- | --- | --- |
| Sample: | | |
| 1 | 79 | [1] 26.7 |
| 2 | 91 | 0.22 |
| 3 | 150 | 0.02 |
| 4 | 202 | 0.01 |

[1] 0.468 mole.

By the method described, aqueous solutions of cyclopropylamine of as much as 25 to 30 percent concentration are conveniently made for such purposes as manufacture of cyclopropylamino-s-triazine herbicides. The aqueous solution may be used directly, without the necessity of prior removal of water.

The illustrative laboratory procedure discussed and exemplified above serves to explain the nature of the various steps and indicate the order of magnitude of yield and conversion to be expected. In commercial operation it is preferred to employ the slurry product mixture from step (a) directly in step (b), then proceed immediately to steps (c), (d) and (e) as exemplified by the following procedure.

(a) To a stirred slurry of 29.7 g. (0.55 mole) of powdered sodium methoxide in toluene at 100° was added slowly during the course of 1 hr. a solution of 68.3 g. (0.5 mole) of methyl γ-chlorobutyrate in 160 ml. of toluene. After addition had been completed, the slurry was refluxed with stirring for 6 hrs. During this time the temperature fell to 76°. The reaction mixture was cooled to room temperature and the entire reaction mass, which consisted of a toluene slurry of sodium chloride, methyl cyclopropanecarboxylate, methanol and unchanged sodium methoxide, was transferred to a 1-1. autoclave.

(b) The autoclave was flushed with ammonia, then pressured to 110 p.s.i. with ammonia. Cold methanol was pumped through the internal cooling coils of the autoclave, and when the pressure fell to 0 p.s.i., 110 g. of liquid ammonia was added. Agitation was begun and the autoclave was heated slowly to 80° where the temperature was maintained for 8 hrs. (pressure 400 p.s.i.). The autoclave was allowed to cool slowly to room temperature; then it was vented slowly.

(c) The reaction mixture was transferred to a three-necked flask, which was equipped with a stirrer and a distillation column, and the mixture was distilled slowly to remove methanol and ammonia until the head temperature reached 100°. During the distillation cyclopropanecarboxamide began to crystallize, and as the reaction mass was allowed to cool to room temperature, crystallization proceeded until stirring became difficult.

(d) The reaction mass was extracted with three 200-ml. portions of cold water containing sufficient hydrochloric acid to obtain a final pH of about 4, then the combined aqueous extracts were employed directly in step (f) and the organic phase was recovered for recycle to step (a).

Steps (f) and (g) were performed substantially as described above. Overall yield of cyclopropylamine based on methyl γ-chlorobutyrate for the entire process was approximately 80 percent.

The improved method of manufacture eliminates intermediate purification procedures with consequent product losses. Unreacted materials, including the non-reactive liquid reaction medium are recirculated in the process, so as to obtain maximum overall yields. There exists a fairly wide choice of non-reactive organic liquids which may be employed as reaction media. Low cost, low fire hazard, low toxicity chemical stability and a boiling range which facilitates distillation are factors to be considered in making a choice from the commonly available organic solvents. Toluene and xylene are probably the cheapest and most convenient for the purpose.

The critical conditions employed in the amidation step assure maximum conversion and yield. The stepwise procedure of the Hofmann reaction employing specific reaction conditions has been discovered to not only greatly improve overall yields but to eliminate the formation of substantial quantities of undesirable by-products which would make necessary an additional purification step.

We claim:
1. A procedure for manufacturing an aqueous solution of cyclopropylamine comprising performing the following steps in the sequence and manner set forth below:
   (a) reacting methyl 4-chlorobutyrate with sodium methoxide under an inert gas atmosphere in a non-reactive organic liquid reaction medium under substantially moisture-free conditions and in the presence of an organic liquid phase recycled from step (e) to yield a product mixture containing methyl cyclopropanecarboxylate,
   (b) reacting gaseous ammonia with the product mixture from step (a) at a temperature between 80° and 115° C. in the absence of water and in the presence of 0.1 to 0.3 mole of sodium methoxide and 40 to 80 ml. of methanol per mole of methyl cyclopropanecarboxylate, said ammonia being present in a ratio of about 1.5 to 3 moles per mole of methyl cyclopropanecarboxylate, thereby obtaining a reaction product mixture containing cyclopropanecarboxamide,
   (c) removing methanol and unreacted ammonia from the reaction product mixture of step (b), thereby obtaining a distillation residue consisting essentially of non-reactive organic liquid reaction medium, cyclopropanecarboxamide and unchanged methyl cyclopropanecarboxylate,
   (d) adding the distillation residue obtained in step (c) to sufficient water and mineral acid to obtain an aqueous solution phase having a pH below 6.5 containing the cyclopropanecarboxamide dissolved therein and an organic liquid phase,
   (e) separating and drying the organic liquid phase obtained in step (d) and recycling the dried organic liquid phase to step (a),
   (f) reacting sodium hypochlorite and sodium hydroxide with the aqueous solution phase obtained in step (d) by first adding the aqueous solution phase at a controlled rate to an aqueous solution of sodium hypochlorite at a temperature near 0° C. to yield a homogeneous solution reaction mixture containing an intermediate product, then adding sodium hydroxide to the homogeneous solution reaction mixture at a temperature near 0° C., raising the temperature of the resulting reaction mixture to between 40° C. and 50° C. and controlling the temperature between 40° C. and 50° C. while reacting sufficient sodium hydroxide with the reaction mixture containing the intermediate product to yield a product mixture containing cyclopropylamine, and
   (g) subsequently distilling the product mixture of step (f) to yield an aqueous solution of cyclopropylamine as a distillate product.

References Cited

UNITED STATES PATENTS 3,503,971   3/1970   Neighbors et al. __ 260—563 R X

OTHER REFERENCES

Julia et al.: Bull. Soc. Chim. France, 1962, 304–12.

Smith: "Open-Chain Nitrogen Compounds" 1, 152 (1965).

Adams et al.: "Organic Reactions" III, 268–9 (1946).

LEWIS GOTTS, Primary Examiner

D. R. PHILLIPS, Assistant Examiner

U.S. Cl. X.R.

71—93; 260—249.5